(12) United States Patent
Kupratis et al.

(10) Patent No.: US 10,794,193 B2
(45) Date of Patent: Oct. 6, 2020

(54) AIR FOIL WITH GALVANIC PROTECTION

(71) Applicant: UNITED TECHNOLOGIES CORPORATION, Farmington, CT (US)

(72) Inventors: Daniel Bernard Kupratis, Wallingford, CT (US); Mary Colby, West Hartford, CT (US); Paul R Hanrahan, Farmington, CT (US); Frederick M Schwarz, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1306 days.

(21) Appl. No.: 15/244,281

(22) Filed: Aug. 23, 2016

(65) Prior Publication Data
US 2018/0058221 A1   Mar. 1, 2018

(51) Int. Cl.
| | | |
|---|---|---|
| F01D 5/14 | (2006.01) | |
| F01D 5/28 | (2006.01) | |
| F04D 29/32 | (2006.01) | |
| F01D 25/00 | (2006.01) | |

(52) U.S. Cl.
CPC .............. *F01D 5/147* (2013.01); *F01D 5/28* (2013.01); *F04D 29/324* (2013.01); *F01D 25/007* (2013.01); *F05D 2220/32* (2013.01); *F05D 2230/10* (2013.01); *F05D 2230/60* (2013.01); *F05D 2240/303* (2013.01); *F05D 2260/95* (2013.01); *F05D 2300/121* (2013.01); *F05D 2300/125* (2013.01); *F05D 2300/133* (2013.01); *F05D 2300/173* (2013.01); *F05D 2300/175* (2013.01); *F05D 2300/612* (2013.01); *Y02T 50/672* (2013.01)

(58) Field of Classification Search
None
See application file for complete search history.

(56) References Cited

U.S. PATENT DOCUMENTS

| | | | | |
|---|---|---|---|---|
| 7,594,325 | B2 * | 9/2009 | Read | B21D 26/055 |
| | | | | 29/889 |
| 2013/0167555 | A1 * | 7/2013 | Schwarz | F01D 5/147 |
| | | | | 60/805 |
| 2014/0170435 | A1 * | 6/2014 | Hui | F01D 5/147 |
| | | | | 428/613 |

FOREIGN PATENT DOCUMENTS

| | | |
|---|---|---|
| EP | 1811129 A2 | 7/2007 |
| EP | 2633942 A2 | 9/2013 |
| EP | 2977552 A1 | 1/2016 |
| WO | 2014149365 A1 | 9/2014 |
| WO | 2015047756 A1 | 4/2015 |

OTHER PUBLICATIONS

Extended European Search Report dated Jan. 22, 2018 in European Application No. 17184506.8.

* cited by examiner

*Primary Examiner* — Kayla McCaffrey
(74) *Attorney, Agent, or Firm* — Snell & Wilmer L.L.P.

(57) ABSTRACT

An air foil includes a body and a filler. The body may include a chamber formed therein and includes a first metallic material. The filler may at least partially occupy the chamber of the body and may include a second metallic material. The second metallic material may have a comparatively more negative electrode potential than the first metallic material.

14 Claims, 5 Drawing Sheets

AIR FOIL WITH GALVANIC PROTECTION

FIELD

The present disclosure relates to gas turbine engines, and more specifically, to metal air foils in gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

The fan section, compressor section, and turbine section typically include a series of rotor systems. Rotor systems typically include a disk and a plurality of circumferentially spaced blades, such as air foils. Air foils may be made from multiple types of metallic materials that have different electrode potentials. Where dissimilar metals and/or metal alloys come into contact with one another in the presence of an electrolyte, such as air, water, etc., one metallic material may act as an anode and the other metallic material may act as a cathode, creating a galvanic electrochemical cell. This results in galvanic corrosion, in which one metallic material is preferentially corroded as a consequence of spontaneous oxidation-reduction chemical reactions occurring between the dissimilar metallic materials of the air foil. The addition of an adhesive material in the bonding of dissimilar metallic materials may not sufficiently prevent galvanic corrosion of the air foil.

SUMMARY

In various embodiments, the present disclosure provides an air foil that includes a body and a filler. The body may include a chamber formed therein and includes a first metallic material. The filler may at least partially occupy the chamber of the body and may include a second metallic material. The second metallic material may have a comparatively more negative electrode potential than the first metallic material.

In various embodiments, the air foil further may include a sheath coupled to the body. The sheath may have a third metallic material and the second metallic material have a comparatively more negative electrode potential than the third metallic material. In various embodiments, the second magnetic material is at least one of magnesium and a magnesium alloy. The first metallic material may be at least one of aluminum and an aluminum alloy and the third metallic material may be titanium. In various embodiments, the filler may include a metallic foam. The metallic foam may be at least one of a magnesium foam and a magnesium foam alloy. In various embodiments, the chamber may be one of multiple chambers formed in the body and the filler may include multiple filler sections corresponding to and at least partially occupying the multiple chambers. In various embodiments, the multiple filler sections may include a first filler section and a second filler section. The first filler section may include the second metallic material and the second filler section may include a fourth metallic material. The second metallic material may have a comparatively more negative electrode potential than the fourth metallic material.

In various embodiments, the second metallic material may be at least one of magnesium and a magnesium alloy. In various embodiments, the fourth metallic material may be at least one of aluminum and an aluminum alloy. According to various embodiments, the first filler section may include a first metallic foam and the second filler section may include a second metallic foam. The first metallic foam may be at least one of a magnesium foam and a magnesium alloy foam and the second metallic foam may be at least one of an aluminum foam and an aluminum alloy foam.

In various embodiments, the multiple chambers include at least one chamber that extends from adjacent a hub end of the body to adjacent a radially outward tip of the body. In various embodiments, the multiple chambers may include at least one chamber that extends from adjacent a leading edge of the body towards a trailing edge of the body. According to various embodiments, the sheath may be coupled to a leading edge of the body. In various embodiments, the air foil may further include a cover coupled to at least one of a suction surface and a pressure surface of the body, wherein the cover extends across the chamber.

Also disclosed herein, according to various embodiments, is a method of manufacturing an air foil. The method may include forming a chamber in a body of the air foil, positioning a filler in the chamber, and, after positioning the filler in the chamber, coupling a cover to the body of the air foil that extends across the chamber. In various embodiments, forming the chamber in the body of the air foil includes machining the chamber in at least one of a suction surface and a pressure surface of the body of the air foil. In various embodiments, forming the chamber in the body of the air foil includes machining multiple chambers. According to various embodiments, the cover extends across the multiple chambers. The method may further include coupling a sheath to a leading edge of the body of the air foil, in accordance with various embodiments.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, an air foil is disclosed herein. While the term "air foil" is used herein, the details of the present disclosure may be implemented in conjunction with turbine blades, compressor blades, and/or other rotors.

Figure 1:
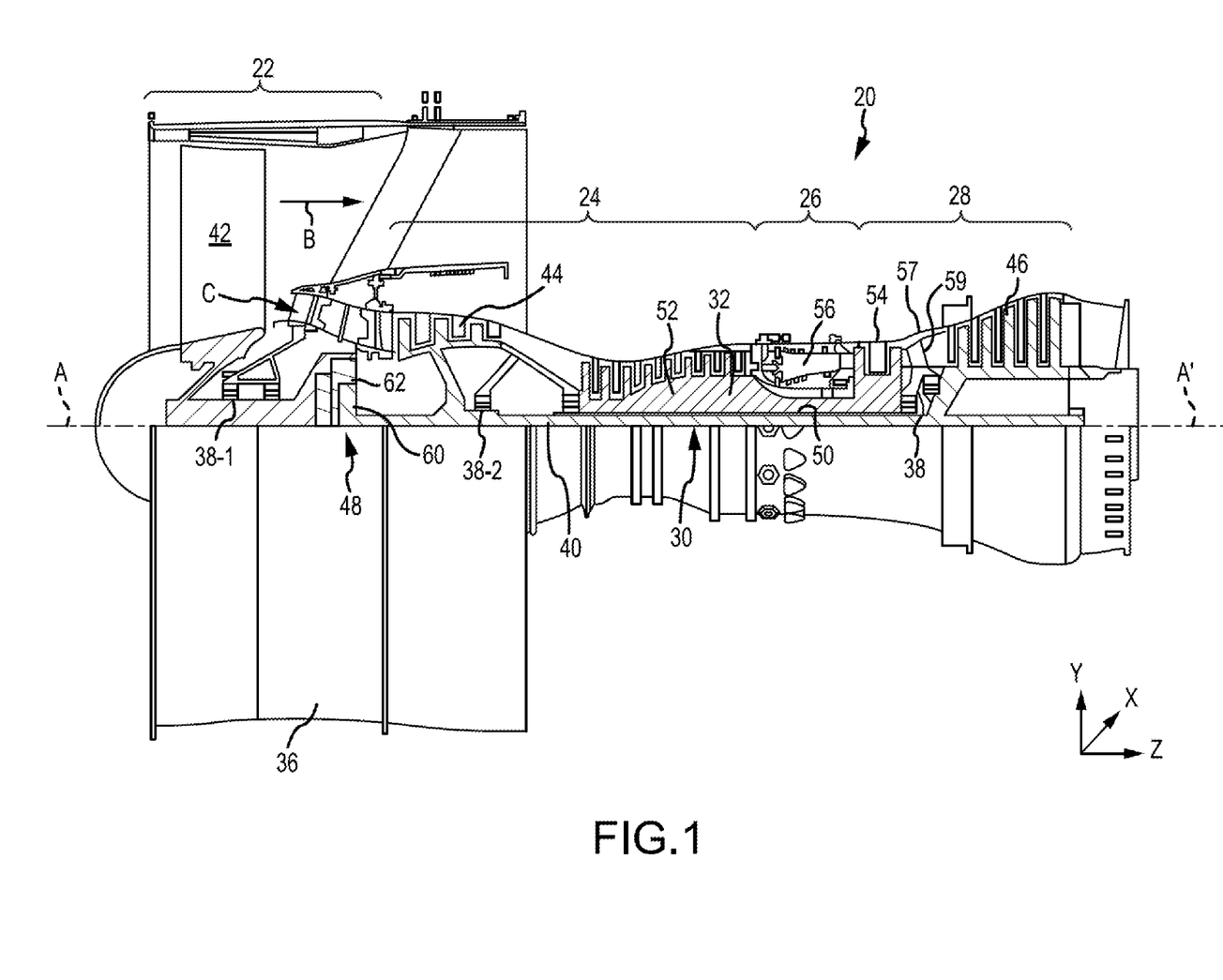
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

The fan section 22, the compressor section 24 and the turbine section 28 may each comprise rotor systems including blade assemblies having one or more sets of rotating blades, which may rotate about engine central longitudinal axis A-A'. In a turbofan engine, lighter components generally lead to more efficient performance. If less energy is expended moving internal engine parts, more energy is available for useful work. At the same time, the components themselves must be strong enough to withstand forces typical for the operating environment and performance envelope. Additionally, as described above, galvanic corrosion may occur in air foils, thus adversely affecting the structural integrity of the air foils.

Figure 2:
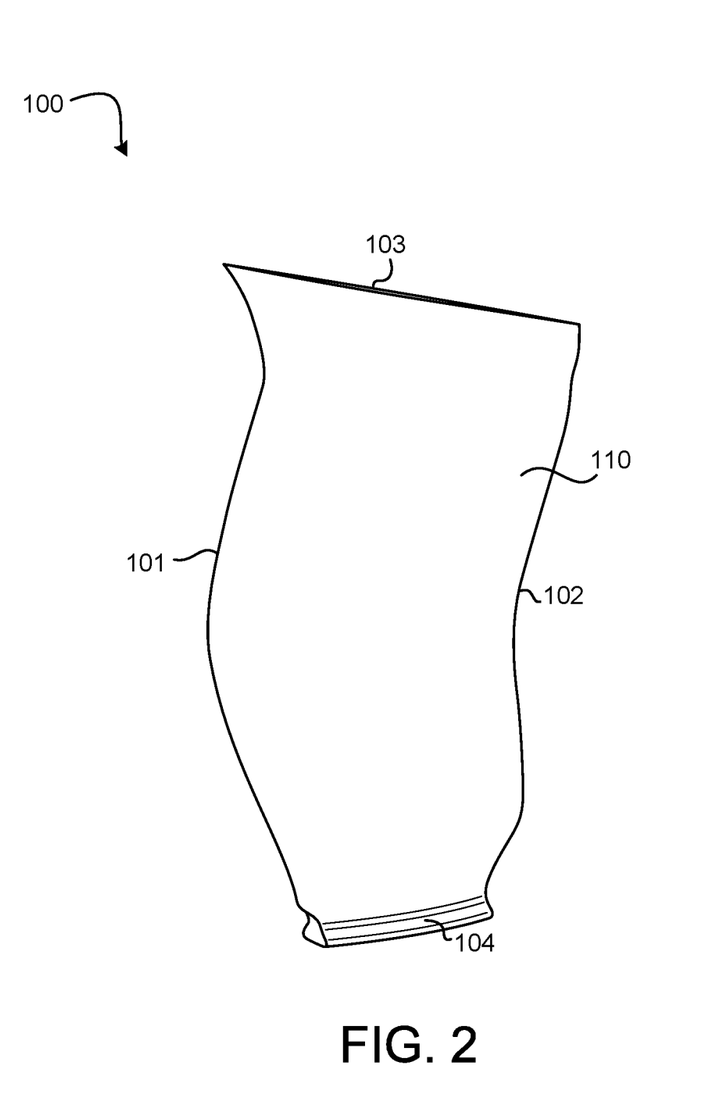
FIG. 2 illustrates a perspective view of an air foil, in accordance with various embodiments.

With reference to FIG. 2, an air foil 100 having a body 110 is disclosed. The air foil 100 may include a hub end 104 for attaching the air foil 100 to a disk of a rotor system. The air foil 100 may also have a radially outer edge or tip 103 located radially outward from the hub end 104. The air foil 100 may have a leading edge 101 opposite a trailing edge 102. In various embodiments, the air foil 100 may further include a generally concave pressure surface and a generally convex suction surface joined together at the respective leading edge 101 and trailing edge 102. The air foil 100 may be curved and twisted relative to, for example, a plane extending radially from the disk, in terms of the overall geometry of the air foil 100.

It will be noted that air foils for gas turbine engines may be provided in the variety of sizes, shapes and geometries. Accordingly, the air foil 100 of the present disclosure is not limited to the specific geometry, size, and shape shown in the figures. Further, as mentioned above, the disclosed air foil 100 is not necessarily limited to the fan section 22 of a gas turbine engine 20, but instead may be implemented in other sections of the gas turbine engine 20 and/or may be adapted for use in other types of jet engines, propellers, rotors, etc.

In various embodiments, the body 110 of the air foil 100 may be fabricated from a metallic material, such as a metal and/or a metal alloy. In various embodiments, for example, the body 110 of the air foil 100 may be fabricated from aluminum, an aluminum alloy, titanium, and/or a titanium alloy, among other suitable metallic materials. Throughout the present disclosure, like reference numbers refer to like elements. Thus, the air foil 100, the body 110, and leading edge 101, for example, shown and described with reference to FIG. 2 may be similar to the like-numbered and similar- or same-named components of FIGS. 3 and 4.

Figure 3:
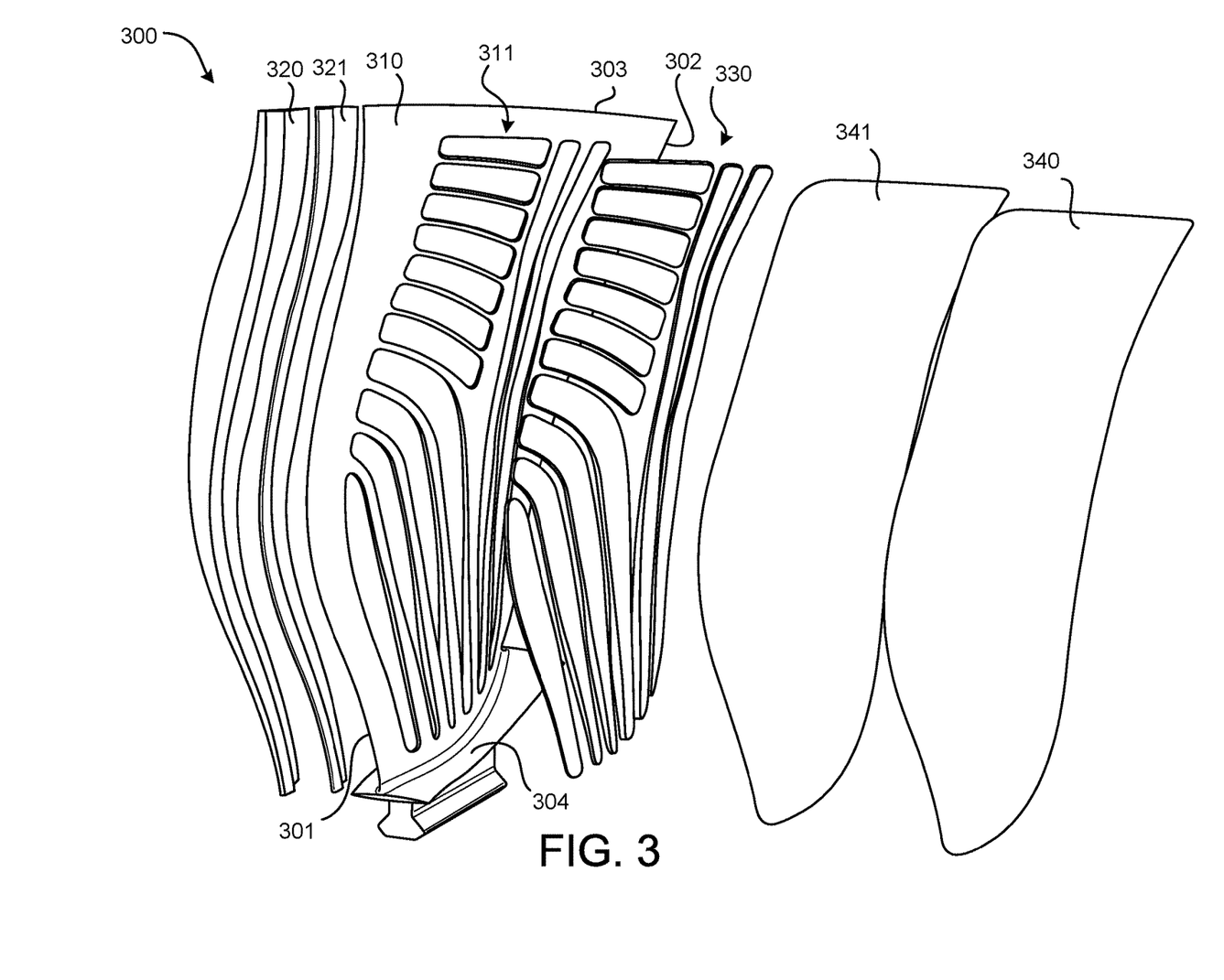
FIG. 3 illustrates a perspective exploded view of an air foil, in accordance with various embodiments.

With reference to FIG. 3, and in accordance with various embodiments, the air foil 300 may include a sheath 320 coupled to the leading edge 301 of the body 310. The sheath 320 may prevent excessive damage to the air foil 300 in the event of a bird strike or other foreign matter. In various embodiments, the sheath 320 may be fabricated from a metallic material, such as a metal and/or a metal alloy. In various embodiments, for example, the sheath 320 may be fabricated from titanium and/or a titanium alloy, among other suitable metallic materials. In various embodiments, the sheath 320 may be coupled to the body 310 using an adhesive 321. For example, the adhesive 321 may be an epoxy adhesive or a urethane adhesive. In various embodiments, the adhesive 321 may comprise, for example, one or more epoxies, bismalemides, cyanate esters, or polyimides, and may be a supported or unsupported film and/or paste.

In various embodiments, the body 310 of the air foil 300 may be made from a first metallic material and the sheath 320 may be made from a second metallic material. The first and second materials, according to various embodiments, may be substantially dissimilar and thus the air foil would be susceptible to galvanic corrosion if not for the filler 330, described in greater detail below, serving as the sacrificial anode. That is, while the adhesive 321 used to couple the sheath 320 to the body 310 may at least partially electrically insulate the body 310 from the sheath 320, in various embodiments the sheath 320 and the body 310 may still be in direct and/or electrical contact with each other, thus potentially allowing the air foil 300 to experience galvanic corrosion if not for the presence of the sacrificial anode filler 330

However, the air foil 300 of the present disclosure, according to various embodiments, also includes a filler 330 that may serve as a sacrificial anode in the galvanic cell of the air foil 300. That is, the body 310 of the air foil 300 may include one or more chambers 311 formed therein. The term "chamber" refers to any recess, cavity, slot, or groove formed in the body 310 of the air foil 300. The filler 330 may be a metallic material, such as a metal and/or a metal alloy, that occupies the one or more chambers 311 of the body 310. In various embodiments, the filler 330 may have a comparatively more negative electrode potential than the material of the body 310 and the sheath 320. Said differently, the body 310 may be made from a first metallic material, the sheath 320 may be made from a second metallic material, and the filler 330 may be made from a third metallic material, wherein the third metallic material may be comparatively more anodic than the first metallic material and the second metallic material. In other words, the third metallic material, the filler 330, may be comparatively more susceptible to oxidation in the galvanic cell and thus may preferentially undergo galvanic corrosion in order to protect the first and second metallic materials, the body 310 and the sheath 320, from galvanic corrosion. Additional details pertaining to the filler 330 are included below.

In various embodiments, the one or more chambers 311 are formed in the suction surface and/or the pressure surface of the body 310 of the air foil 300. The one or more chambers 311 may be cored-out via machining or other similar procedure, as described in greater detail below with reference to FIG. 5. In various embodiments, the body may have a single chamber. In various embodiments, the body 310 may have multiple chambers. The dimension, shape, pattern, and/or configuration of the one or more chambers 311 may be dependent on a specific application and thus the dimension, shape, pattern, and/or configuration of the one or more chambers 311 is not limited to the depictions in the figures.

In various embodiments, the one or more chambers 311 may include multiple chambers, as shown in FIG. 3, that extend in various directions across the body 310 of the air foil 100. For example, in various embodiments at least one chamber of the multiple chambers may extend from adjacent the hub end 304 of the body 310 of the air foil 300 to adjacent the radially outward tip 303 of the body 310 of the air foil 300. In various embodiments, at least one chamber of the multiple chambers may extend from adjacent the leading edge 301 of the body 310 towards the trailing edge 302 of the body 310.

In various embodiments, the filler 330 may be made from magnesium and/or a magnesium alloy. Magnesium is comparatively more susceptible to oxidation than, for example, aluminum and titanium, which may be the materials of the body 310 and the sheath 320, respectively, in accordance with various embodiments. Thus, the filler 330 may serve as the sacrificial anode of the galvanic cell of the air foil 300 by preferentially corroding. In various embodiments, the filler 330 may at least partially occupy the one or more chambers 311. In various embodiments, for example, the filler 330 may completely occupy the volume of the at least one chamber 311. In various embodiments, the filler 330 may only partially fill the volume of the one or more chambers 311 and thus regions of the one or more chambers 311 may be unoccupied or at partially filled with another material.

In various embodiments, the filler 330 may have a metallic foam structure. For example, in various embodiments, the filler 330 may be a magnesium foam, a magnesium oxide foam, and/or a magnesium alloy foam. The metallic foam still enables the filler 330 to serve as the sacrificial anode of the galvanic cell, but also may reduce the weight of the air foil when compared to, for example, a solid metal or solid metal alloy structure.

Figure 4:
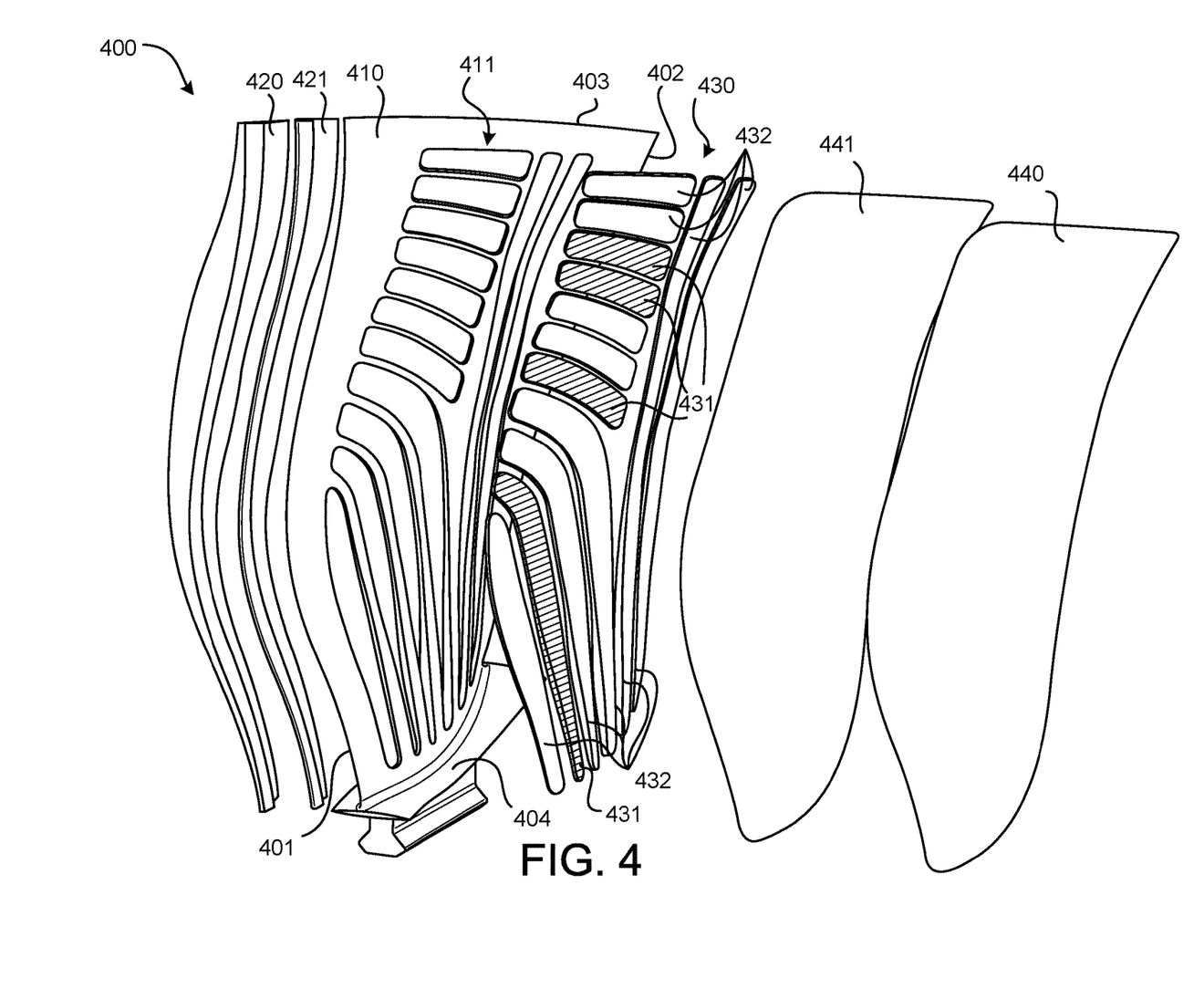
FIG. 4 illustrates a perspective exploded view of an air foil, in accordance with various embodiments.

With reference to FIG. 4, a air foil 400 having different types of filler 430 is disclosed. In various embodiments, the one or more chambers may include multiple chambers 411 and the filler 430 may include multiple filler sections 431, 432 that correspond to and occupy the multiple chambers 411. For example, the filler 430 may include at least one first filler section 431 and at least one second filler section 432. The at least one first filler section 431 may be fabricated from, for example, a metallic material that is different than the metallic material of the at least one second filler section 432. That is, in accordance with various embodiments, the at least one first filler section 431 may have a more negative electrode potential than the at least one second filler section 432 and thus may preferentially corrode. In various embodiments, the at least one second filler section 432 may have a comparatively higher mechanical yield strength.

In various embodiments, the distribution and relative configuration/positioning of the first and second filler sections 431, 432 may be dependent on a specific application. For example, if an air foil of a first gas turbine engine is expected to experience comparatively more caustic, corrosive environments than another gas turbine engine, such air foil may have comparatively more sections of the first filler section 431 than the second filler sections 432. On the other hand, if an air foil of a second gas turbine engine is expected to experience comparatively more bird strikes and/or is expected to require a comparatively greater mechanical strength than another gas turbine engine, such air foil may have comparatively more sections of the section filler section 432 than the first filler section 431.

In various embodiments, for example, the at least one first filler section 431 may be fabricated from magnesium or a magnesium alloy and the at least one second filler section 432 may be fabricated from aluminum or an aluminum alloy. In various embodiments, the at least one first filler section 431 may be fabricated from a magnesium foam and the at least one second filler section 432 may be fabricated from an aluminum foam. In various embodiments, the aluminum foam may a comparatively higher mechanical yield strength while the magnesium foam may be comparatively more susceptible to oxidation. In various embodiments, the magnesium foam may be less dense than the aluminum foam, thus providing additional weight reduction benefits when compared with the aluminum foam.

With reference to FIGS. 3 and 4, the air foil 300/400 may further include a cover 340/440 coupled to the body 310/410. The cover 440 may extend across and cover the at least one chamber 411 formed in the body 410. In various embodiments, the cover 440 may not extend across the entire suction surface and/or pressure surface of the body 410. In other words, the air foil 400 may have portions of the body 410 that are left uncovered by the cover 440, in accordance with various embodiments. For example, the leading edge 401, the trailing edge 402, the radially outward tip 403, and the hub end 404 of the air foil 400 may be free of the cover 440. In various embodiments, the cover 440 may be coupled to the body 410 using an adhesive 341/441. In various embodiments, the adhesive 341/441 may be, for example, a urethane-based adhesive, polyurethane-based adhesive, epoxy-based adhesive, epoxy film, rubber adhesive and/or other suitable adhesive may. In various embodiments, the adhesive 341/441 may be a continuous sheet of material. In various embodiments, the adhesive 341/441 may not be continuous but instead may include cut-outs that correspond with the chambers 311/411. For example, the adhesive 341/441 may be configured to cover and contact the raised portions of the body 310/410 and may not be configured to contact the filler 330/430 positioned within the chambers 311/411, in accordance with various embodiments. In various embodiments, the cover 440 may be made from a metallic material, such as aluminum, aluminum alloy, titanium, and/or titanium alloy.

In various embodiments, the cover 440 may be fabricated from a composite material such as carbon fiber, fiber-reinforced polymer (e.g., fiber glass), para-aramid fiber, and/or aramid fiber. In various embodiments, the cover 440 may be fabricated from a fiber metal laminate ("FML"). For example, the cover 440 may include metal layers comprising titanium and/or a titanium alloy and the composite material layers in the FML may comprise carbon fiber, such as graphite fiber. An FML comprising titanium and/or a titanium alloy and graphite fiber is commonly known in the industry as "TiGr." In various embodiments, in which an FML comprises metal layers comprising aluminum and/or an aluminum alloy, the composite material layers in the FML may comprise fiber-reinforced polymer (e.g., fiber glass), para-aramid fiber, and/or aramid fiber. An FML comprising aluminum and/or an aluminum alloy and fiber glass is commonly known by the industry standard designation of "GLARE."

Though FMLs described above include specific examples of metals, metal alloys, and/or composite materials, it would not be outside the scope of this disclosure to include any FML comprising any metal, metal alloy, and/or composite material, in any arrangement of layers.

In various embodiments, FML layers and/or stacks of FML layers may be coupled together using an adhesive material. In various embodiments, the adhesive material may comprise, for example, one or more epoxies, bismalemides, cyanate esters, or polyimides, and may be a supported or unsupported film and/or paste. A supported adhesive material may comprise a support comprised of nylon, polyester, fiberglass, or glass, which may be woven or non-woven. In various embodiments the adhesive material may comprise an amine cured, toughened epoxy resin system supplied with unidirectional and/or woven carbon or glass fibers.

Figure 5:
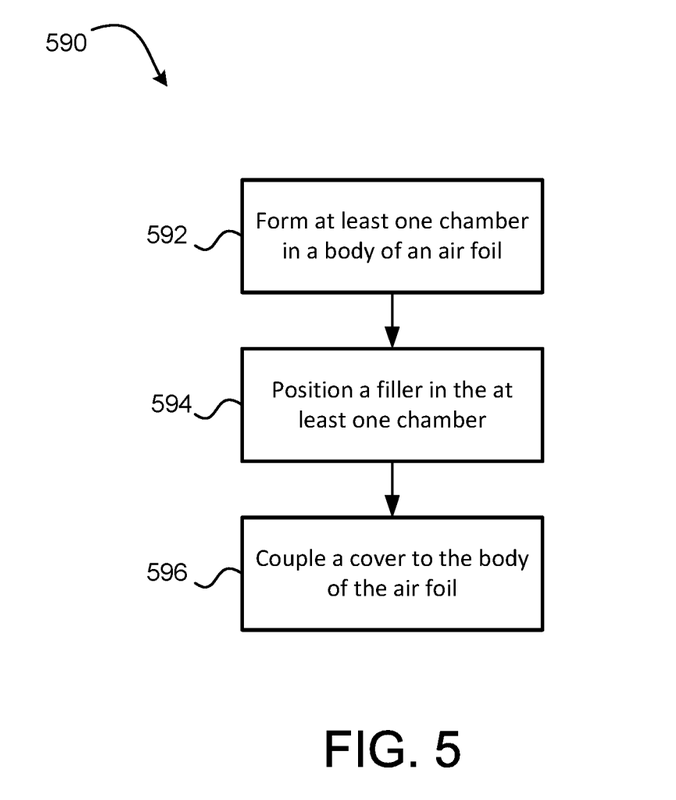
FIG. 5 is a schematic flowchart diagram of a method of manufacturing an air foil, in accordance with various embodiments.

FIG. 5 is a schematic flowchart diagram of a method 590 of manufacturing an air foil. The method 590 may include, according to various embodiments, forming at least one chamber in a body of the air foil at step 592, positioning a filler in the at least one chamber at step 594, and, after positioning the filler in the at least one chamber, coupling a cover to the body of the air foil that extends across and covers the at least one chamber at step 596.

In various embodiments, step 592 of forming at least one chamber in the body of the air foil may include machining the at least one chamber in at least one of a suction surface and a pressure surface of the body of the air foil. In various embodiments, step 592 of forming at least one chamber in the body of the air foil may include machining multiple chambers. Accordingly, step 596 of coupling the cover to the body may include extending across and covering the multiple chambers. The method 590 may further include, according to various embodiments, coupling a sheath to a leading edge of the body of the air foil.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil for a gas turbine comprising:
 a body comprising multiple chambers formed therein, wherein the body comprises a first metallic material, wherein the multiple chambers comprise a first chamber and a second chamber, with raised portions of the body disposed between the first chamber and the second chamber to separate the first chamber from the second chamber;
 a sheath coupled to the body, the sheath comprising a second metallic material; and
 multiple filler sections corresponding to and at least partially occupying the multiple chambers of the body, wherein the multiple filler sections comprise at least one first filler section comprising a first filler material disposed in the first chamber and at least one second filler section comprising a second filler material disposed in the second chamber;
 wherein the first filler material is selected to have a comparatively more negative electrode potential than the first metallic material, the second metallic material, and the second filler material;
 wherein the second filler material is selected to have a comparatively higher mechanical yield strength than the first filler material.

2. The airfoil of claim 1, wherein the first filler material is a magnesium oxide.

3. The airfoil of claim 2, wherein the first metallic material is at least one of aluminum and an aluminum alloy and the second metallic material is titanium.

4. The airfoil of claim 1, wherein the first filler material comprises a metallic foam.

5. The airfoil of claim 4, wherein the metallic foam is a magnesium oxide.

6. The airfoil of claim 1, wherein the first filler material comprises a first metallic foam and the second filler material comprises a second metallic foam.

7. The airfoil of claim 6, wherein the first metallic foam is at least one of a magnesium foam and a magnesium alloy foam and the second metallic foam is at least one of an aluminum foam and an aluminum alloy foam.

8. The airfoil of claim 1, wherein the multiple chambers comprise at least one chamber that extends from adjacent a hub end of the body to adjacent a radially outward tip of the body, wherein the second filler material is disposed in the at least one chamber.

9. The airfoil of claim 1, wherein the multiple chambers comprise at least one chamber that extends from adjacent a leading edge of the body towards a trailing edge of the body.

10. The airfoil of claim 1, further comprising a cover coupled to at least one of a suction surface and a pressure surface of the body, wherein the cover extends across the chamber.

11. A method of manufacturing an airfoil, the method comprising:
  forming a chamber in a body of the airfoil, wherein the body comprises a first metallic material;
  selecting a second metallic material having a more negative electrode potential than the first metallic material; and
  positioning a filler in the chamber, the filler comprising the second metallic material.

12. The method of claim 11, wherein:
  the method further comprises coupling a sheath to the body, the sheath comprising a third metallic material; and
  selecting the second metallic material comprises having the second metallic material have a more negative electrode potential than the third metallic material.

13. The method of claim 11, wherein forming the chamber in the body of the airfoil comprises machining multiple chambers.

14. The method of claim 11, further comprising coupling a sheath to a leading edge of the body of the airfoil.

* * * * *